United States Patent
Kollu et al.

(10) Patent No.: US 10,505,855 B2
(45) Date of Patent: Dec. 10, 2019

(54) USE OF PRIMITIVES TO NOTIFY OF SLOW DRAIN CONDITION

(71) Applicant: AVAGO TECHNOLOGIES INTERNATIONAL SALES PTE. LIMITED, Singapore (SG)

(72) Inventors: Badrinath Kollu, San Jose, CA (US); Kung-Ling Ko, Union City, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 78 days.

(21) Appl. No.: 15/857,866

(22) Filed: Dec. 29, 2017

(65) Prior Publication Data

US 2018/0198722 A1  Jul. 12, 2018

Related U.S. Application Data

(60) Provisional application No. 62/443,248, filed on Jan. 6, 2017.

(51) Int. Cl.
| | | |
|---|---|---|
| *H04L 12/801* | (2013.01) | |
| *H04L 12/835* | (2013.01) | |
| *H04L 12/851* | (2013.01) | |
| *H04L 12/931* | (2013.01) | |

(52) U.S. Cl.
CPC .......... *H04L 47/35* (2013.01); *H04L 47/2483* (2013.01); *H04L 47/30* (2013.01); *H04L 47/39* (2013.01); *H04L 49/357* (2013.01)

(58) Field of Classification Search
CPC ..... H04L 47/35; H04L 47/39; H04L 47/2483; H04L 47/30; H04L 49/3018; H04L 49/3027; H04L 49/357
See application file for complete search history.

(56) References Cited

U.S. PATENT DOCUMENTS

| | | | | |
|---|---|---|---|---|
| 2005/0108444 A1* | 5/2005 | Flauaus | ............... | H04L 41/0853 710/15 |
| 2012/0063329 A1* | 3/2012 | Gnanasekaran | .... | H04L 41/0213 370/248 |
| 2018/0063004 A1* | 3/2018 | Uppunda | ................ | H04L 45/28 |
| 2018/0069775 A1* | 3/2018 | Bharadwaj | .......... | H04L 43/0882 |

* cited by examiner

*Primary Examiner* — Walli Z Butt
(74) *Attorney, Agent, or Firm* — Xsensus, LLP

(57) ABSTRACT

A switch detecting a slow drain situation and providing a slow drain primitive to the slow draining device, such as a storage unit. The slow draining device detects the slow drain primitive and provides a throttling message to the relevant sources of frames being received by the slow draining device. The use of a primitive instead of a frame allows the slow condition notification to be provided even when there is no available credit for sending a frame.

16 Claims, 7 Drawing Sheets

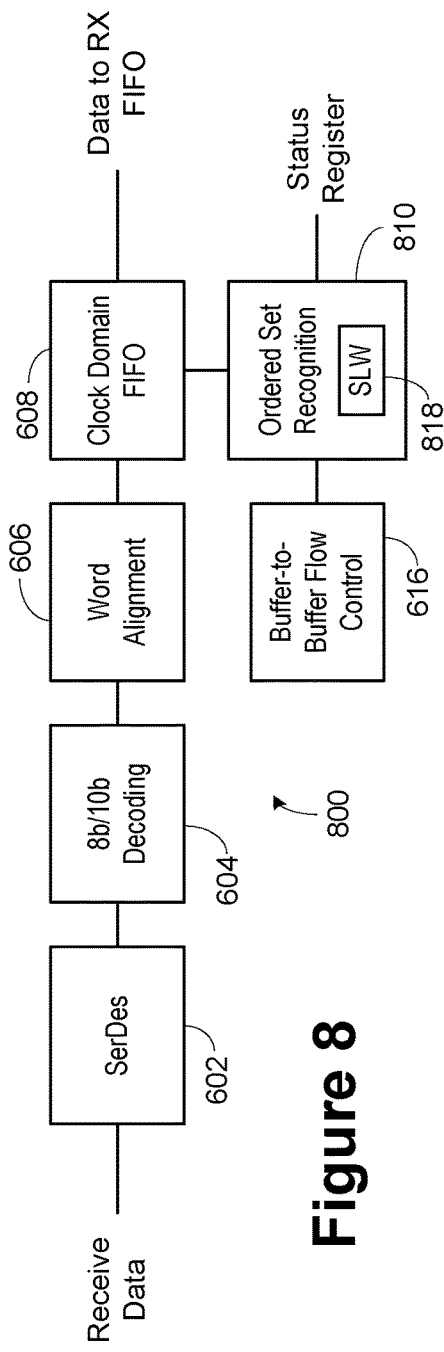
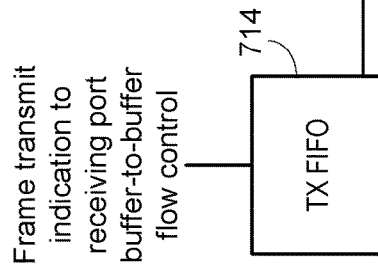

USE OF PRIMITIVES TO NOTIFY OF SLOW DRAIN CONDITION

CROSS REFERENCE TO RELATED APPLICATIONS

This application claims the benefit under 35 U.S.C. § 119(e) of U.S. Provisional Patent Application Ser. No. 62/443,248 entitled "Use of Primitives to Notify of Slow Drain Condition," filed Jan. 6, 2017, which is hereby incorporated by reference.

BACKGROUND

Fibre Channel is a network protocol that uses credit-based flow control. Each input port has a buffer of a given number of credits. The connected output port is informed of this given number of credits and uses that as a reference for a credit counter. Each time a frame is transmitted by the output port, the credit counter is incremented. Each time a frame is consumed at the target having the input port, meaning that a frame has been removed from the buffer, a ready is returned to the source. When the source receives this ready, the credit counter is decremented. Prior to transmitting a frame, the output port determines if the credit counter has reached the given number of credits. If so, this means that the buffer at the input port is full and the frame cannot be transmitted.

This process works smoothly as long as the target is consuming frames at basically the rate being provided by the source. However, if the target is consuming frames slower than the source, a slow drain condition is present (or at least developing). Should this slow drain condition persist, eventually the input buffer is filled and the flow stops and no more frames are received.

It is common in various networking protocols to provide a message back to a source to indicate that it should slow down, as the target is falling behind. This is straightforward if the target itself detects the condition. In various cases the target cannot determine the condition and a connected switch must provide a message to the target to inform the target of the condition, so that the target can then send the slow down message to the source or sources.

However, if the network protocol is using credit-based flow control, such as Fibre Channel, there may be no credit remaining to allow the switch to send the message to the target. Under that condition, the switch cannot provide the message, the target never sends the slow down message to the source and the condition persists, hindering network performance.

SUMMARY

In embodiments according to the present invention, a switch detects a slow drain situation and provides a slow drain primitive to the slow draining device, such as a storage unit. The slow draining device detects the slow drain primitive and provides a throttling message to the relevant sources of frames being received by the slow draining device. The use of a primitive instead of a frame allows the slow condition notification to be provided even when there is no available credit for sending a frame.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 8 is a block diagram of a receiver portion of an exemplary Fibre Channel port according to the present invention.

FIG. 9 is a block diagram of a transmit portion of an exemplary Fibre Channel port according to the present invention.

DETAILED DESCRIPTION

Figure 1:
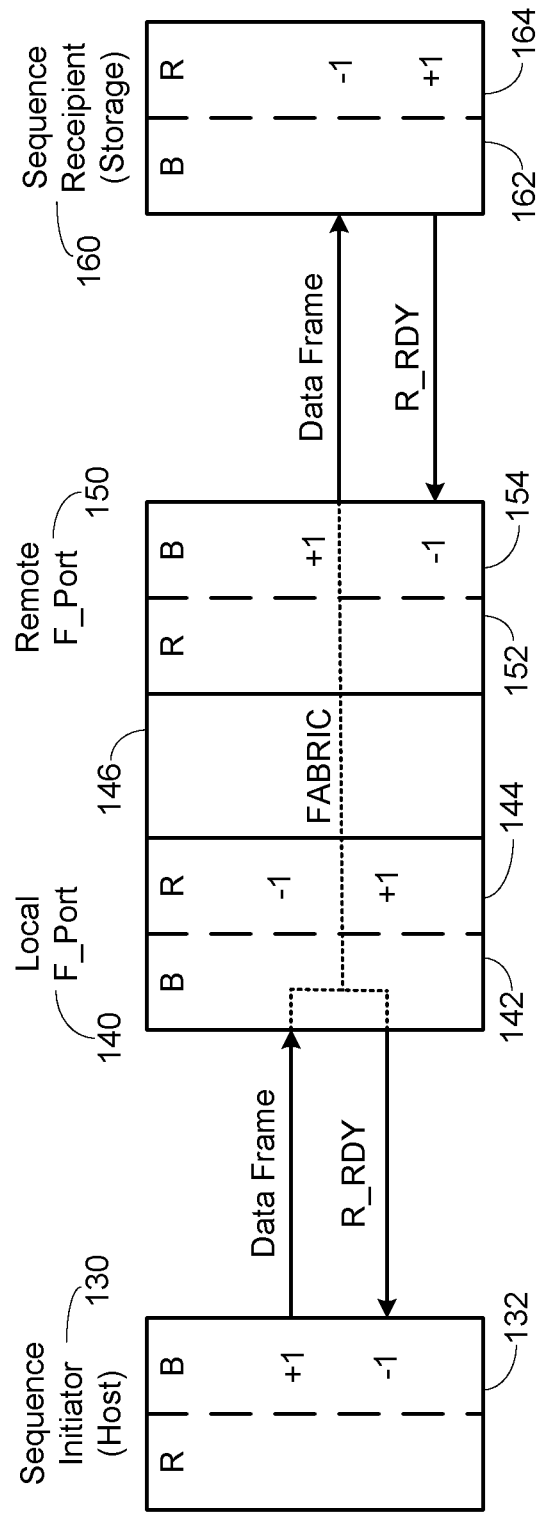
FIG. 1 is a diagram indicating data and credit flow and changes in buffers and counters.

Prior to discussing the preferred embodiments, background on Fibre Channel operation is considered helpful. In general, reference should be made to Fibre Channel Farming and Signaling specifications 4 and 5 (FC-FS-4 and FC-FS-5) for a more complete description of these areas.

Fibre Channel is a serial protocol. Being a serial protocol, the serial stream is encoded, either 8b/10b or 64b/66b, depending on speed. When performing encodings from 8b to 10b or 64b to 66b, various 10b and 66b values are not used. These unused 10b and 66b values can then be used for special purposes, referred to in Fibre Channel as special functions. An ordered set is a pattern in encoded data sent or received by an FC_Port that, when decoded, communicates a special function rather than a data word. A primitive signal or primitive is an ordered set designated by this standard to have special meaning. All FC_Ports shall at a minimum recognize R_RDY and Idle primitive signals. Tables 1 and 2 provide the primitive signals of interest here for 8b/10b and 64b/66b encodings.

Table 1

| 8B/10B Primitive Signals | | |
|---|---|---|
| Abbr. | Primitive Signal | Ordered Set |
| R_RDY | Receiver_Ready | K28.5-D21.4-D10.2-D10.2 |
| VC_RDY | Virtual Circuit Ready | K28.5-D21.7-VC_ID-VC_ID |

TABLE 2

| 64B/66B representation of Primitive Signal Special Functions | | | | | |
|---|---|---|---|---|---|
| Abbr. | Primitive Signal | Order code | Modifier Byte 1 | Modifier Byte 2 | Modifier Byte 3 |
| R_RDY | Receiver_Ready | Fh | 95h | 4Ah | 4Ah |
| VC_RDY | Virtual Circuit Ready | Fh | F5h | VC_ID | VC_ID |

As discussed above, Fibre Channel uses credit-based flow control, referred to as buffer-to-buffer flow control, between connected devices. Buffer-to-buffer flow control rules are as follows:

a) Each FC_Port is responsible for managing its own BB_Credit_CNT;

b) The sending FC_Port shall not transmit a frame unless the allocated BB_Credit is greater than zero and the BB_Credit_CNT is less than this BB_Credit. To avoid possible overrun at the receiver, each FC_Port is responsible for maintaining BB_Credit_CNT less than BB_Credit;

c) Each FC_Port shall set the BB_Credit_CNT value to zero at the end of Login or Relogin in a point-to-point topology, at the end of Login or Relogin to the Fabric in a Fabric topology, or upon recognition of any Primitive Sequence Protocol;

d) Each FC_Port increments BB_Credit_CNT by one for each SOFx2 or SOFx3 transmitted and decrements by one for each R_RDY or VC_RDY received; and e) Recognition of SOFx2 or SOFx3 shall be responded to by a transmission of an R_RDY or VC_RDY when the buffer becomes available.

Managing BB_Credit_CNT for an F_Port is given in Table 3.

TABLE 3

Buffer-to-buffer flow control management

| Activity | BB_Credit_CNT |
| --- | --- |
| FC_Port transmits any frame (including F_BSY(DF), F_BSY(LC), F_RJT, P_BSY, P_RJT or LCR | Increment BB_Credit_CNT by one |
| FC_Port receives R_RDY or VC_RDY | Decrement BB_Credit_CNT by one |
| FC_Port receives any frame (including F_BSY(DF), F_BSY(LC), F_RJT, P_BSY, P_RJT or LCR) | N/A |
| FC_Port transmits R_RDY | N/A |

BB_Credit represents the number of receive buffers supported by an FC_Port for receiving frames. BB_Credit values of the attached FC_Ports are mutually conveyed to each other during the Fabric Login through the Buffer-to-buffer Credit field of the FLOGI Common Service Parameters. The minimum or default value of BB_Credit is one. BB_Credit is used as the controlling parameter in buffer-to-buffer flow control. BB_Credit_CNT is defined as the number of unacknowledged or outstanding frames awaiting R_RDY or VC_RDY responses from the directly attached FC_Port. BB_Credit_CNT represents the number of receive buffers that are occupied at the attached FC_Port. To track the number of frames transmitted for which R_RDY or VC_RDY responses are outstanding, the transmitting FC_Port uses the BB_Credit_CNT. BB_Credit management involves an FC_Port receiving the BB_Credit value from the FC_Port to which it is directly attached. Fabric Login is used to accomplish this. The Common Service Parameters interchanged during Fabric Login provide these values (see FC-LS-3—Fibre Channel Link Services). The transmitting FC_Port is responsible to manage BB_Credit_CNT with BB_Credit as its upper bound.

BB_Credit_CNT and BB_Credit for E_Ports is similar. Exchange link parameters (ELP) is used to provide capability and BB_Credit values for E_Ports.

Referring to FIG. 1, The buffer-to-buffer flow control model is illustrated. The model includes flow control variables for a frame and R_RDY as its response, and the buffers for receiving frames. In general in this description use of R_RDY means R_RDY or VC_RDY, depending on whether the link is operating with virtual channels. VC_RDY is used when virtual channels are present; otherwise R_RDY is used. Each FC_Port provides a number of receive buffers. Each PN_Port obtains the allocation of receive buffers from the Fx_Port (or PN_Port in case of point-to-point topology) to which it is attached, as BB_Credit. Each Fx_Port obtains the allocation of receive buffers from the PN_Port to which it is attached, as total BB_Credit. For any frames received at an FC_Port, an R_RDY is issued when a receive buffer is available. In FIG. 1, a data frame is provided from a sequence initiator 130, usually a host computer. This causes the BB_Credit_CNT value to increment. The data frame is provided to the buffer 144 of a local F_Port 140. The data frame travels through a Fibre Channel fabric 146, such as the internal fabric of a switch, to a remote F_Port 150. The data frame is then provided from the remote F_Port 150 to a sequence recipient 160, usually a storage unit. This transmission of the data frame causes the remote F_Port 150 to increment its BB_Credit_CNT value. The transmission of the data frame also causes the transmission of a R_RDY primitive, a credit, from the local F_Port 140 to the sequence initiator 130. This means that there is one more buffer space in the local F_Port 140 for receiving a data frame and that the sequence initiator 130 can decrement the BB_Credit_CNT value. When the sequence recipient 160 consumes the data frame, such as by storing the data, an R_RDY or credit is provided to the remote F_Port 150 and the remote F_Port 150 BB_Credit_CNT value is decremented.

Figure 2:
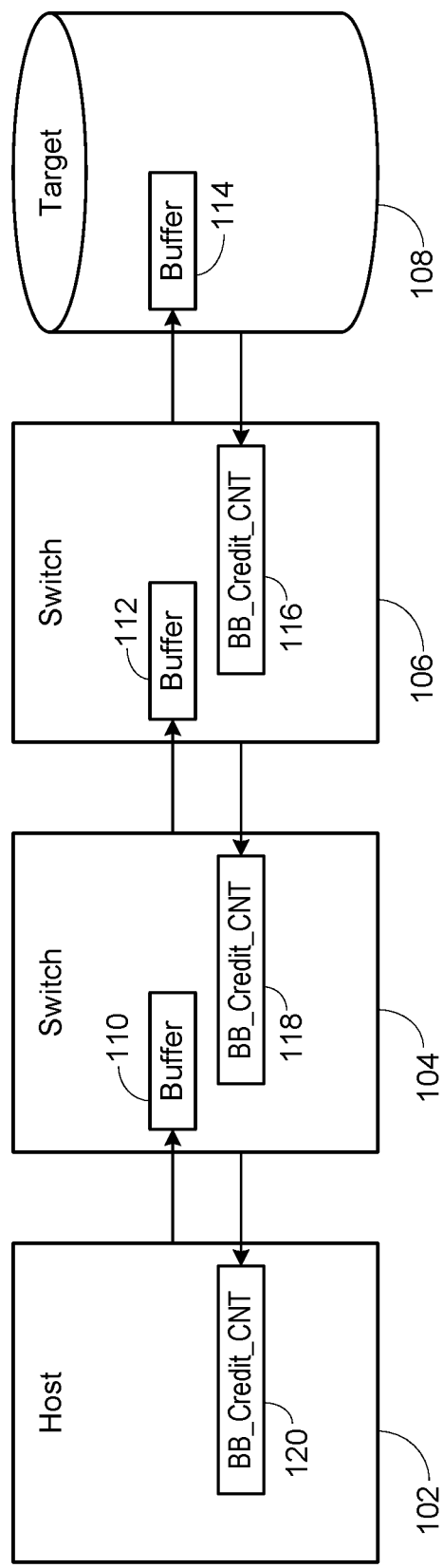
FIG. 2 is block diagram of a block diagram of a Fibre Channel network illustrating the credit-based flow control components and operation.

Referring to FIG. 2, a host 102 is connected to a first switch 104, which is connected to a second switch 106, which is connected to a target 108, such as a storage unit. Input buffers 110, 112, 114 are shown in the first switch 104, the second switch 106 and the target 108, respectively. BB_Credit_CNT or buffer-to-buffer credit count registers 116, 118, 120 are shown in the second switch 106, the first switch 104 and the host 102, respectively.

As discussed above, on initialization the target 108 is provided with the number of credits, a BB Credit value, which can be held by the input buffer 114. The target 108 provides this BB Credit value to the second switch 106, which stores it. When the second switch 106 sends a frame to the target 108, the value in the BB_Credit_CNT register 116 is incremented, as discussed above. Whenever the target 108 removes a frame from the input buffer 114, the target 108 returns a ready or R_RDY primitive, a credit, to the second switch 106. When the second switch 106 receives the R_RDY primitive, the second switch 106 decrements the BB_Credit_CNT register 116. Prior to the second switch 106 sending a frame to the target 108, the transmit logic compares the value in the BB_Credit_CNT register 116 to the BB Credit value. If the values are equal, the input buffer 114 is full and the frame cannot be sent until an R_RDY primitive is received. Operation is similar between the second switch 106 and the first switch 104 and the first switch 104 and the host 102.

Figure 3:
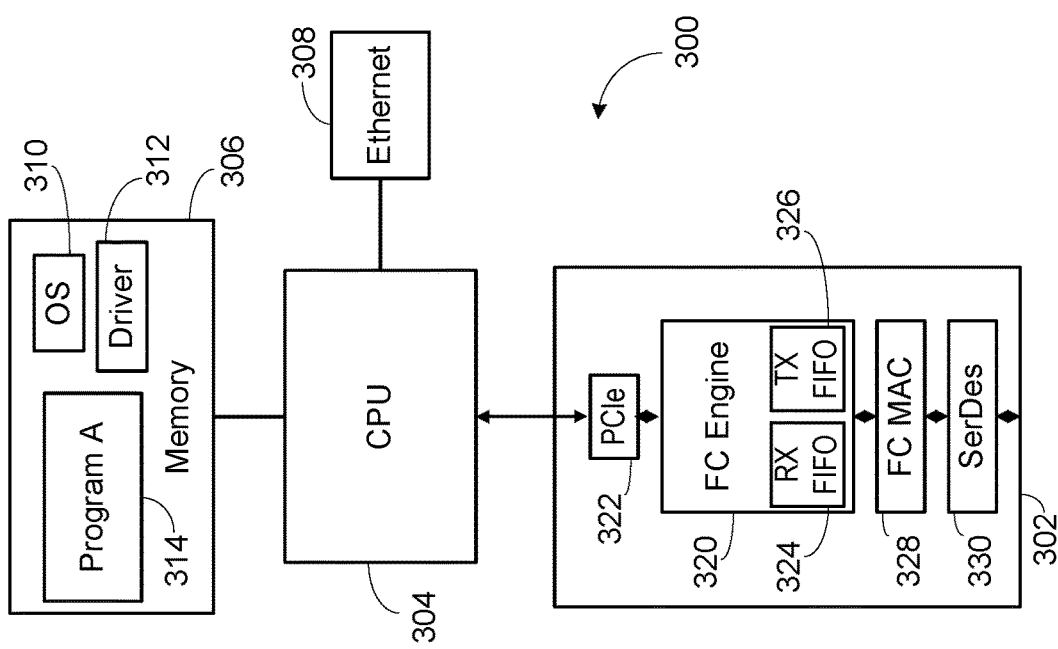
FIG. 3 is a block diagram of host computer.

FIG. 3 is a simple block diagram of a host computer 300 which includes a Fibre Channel host bus adapter (HBA) 302. A CPU 304 is the core of the host computer 300 and has a memory 306 and an Ethernet network interface card (NIC) 308 connected. The memory 306 includes an operating system 310, an HBA driver 312 and a program A 314. The program A 314 is an exemplary program that communicates with individual computer workstations using the Ethernet NIC 308 and stores its data on a Fibre Channel storage unit. The HBA 302 includes an FC engine 320 that is conventionally an ASIC that performs the necessary functions to act as a Fibre Channel interface. A receive (RX) FIFO 324 and transmit (TX) FIFO 326 are contained in the FC engine 320 to act as the FC frame buffers. A PCI Express interface 322 is used connect the HBA 302 to the CPU 304.

An FC MAC 328 is connected to the FC engine 320 to handle the Fibre Channel data encoding and the like. A serializer/deserializer (serdes) 330 interfaces between the FC MAC 328 and the Fibre Channel media interface (not shown) to perform the necessary parallel to serial conversions. This is a simplified block diagram of an HBA, as conventional HBAs are complex, but it sufficient for this explanation, with it being understood that HBAs have many more components than illustrated.

It is understood that this is an exemplary block diagram of a host computer and actual host computers are more complex and have many different architectures, but this simple block diagram is sufficient for this description.

Figure 4:
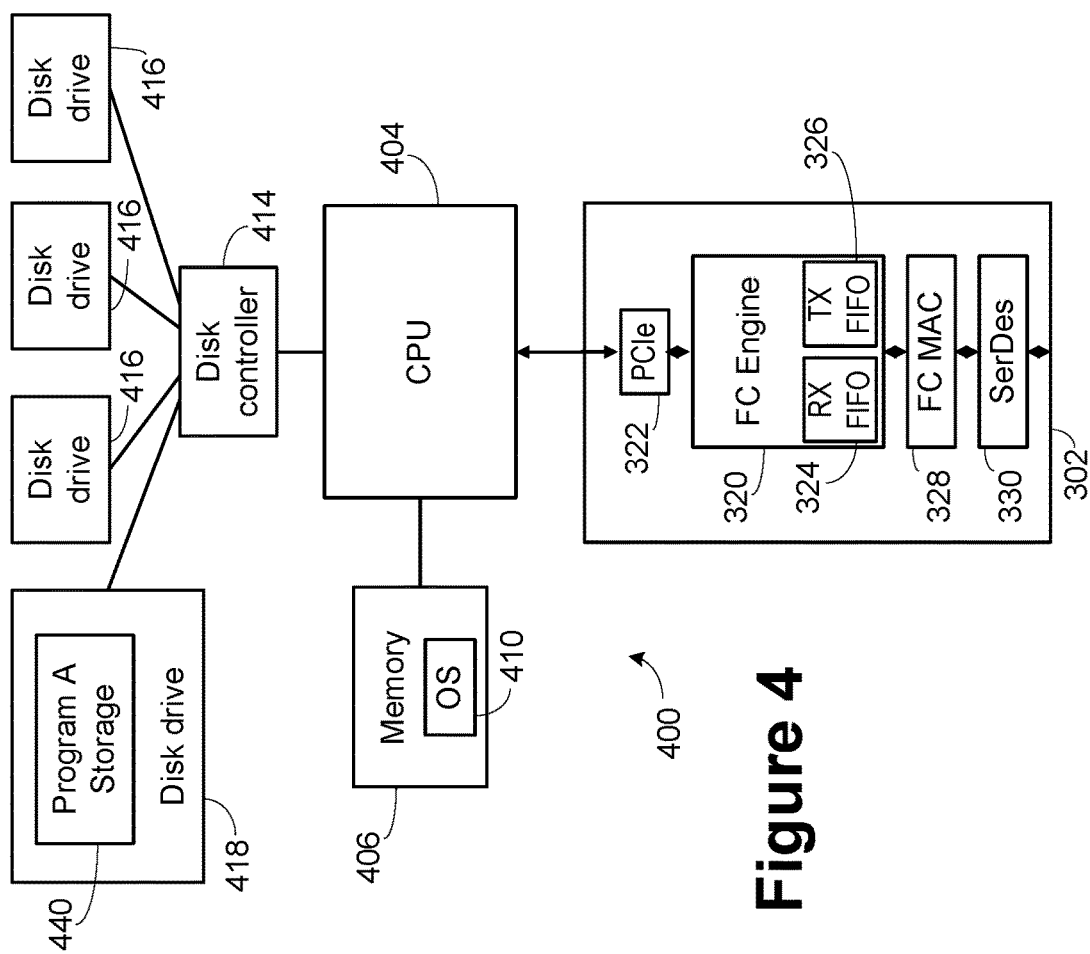
FIG. 4 is a block diagram of a storage unit.

FIG. 4 is a simple block diagram of a storage unit 400. An HBA 302 is connected to a CPU 404 to provide the Fibre Channel interface. A memory 406 is connected to the CPU 404 and contains an operating system 410. A disk controller 414, such as a RAID controller, is connected to the CPU 404 to handle the data storage task. A series of disk drives 416 are connected to the disk controller 414. A disk drive 418, containing the storage 440 for program A 314 is also connected to the disk controller 414.

Figure 5:
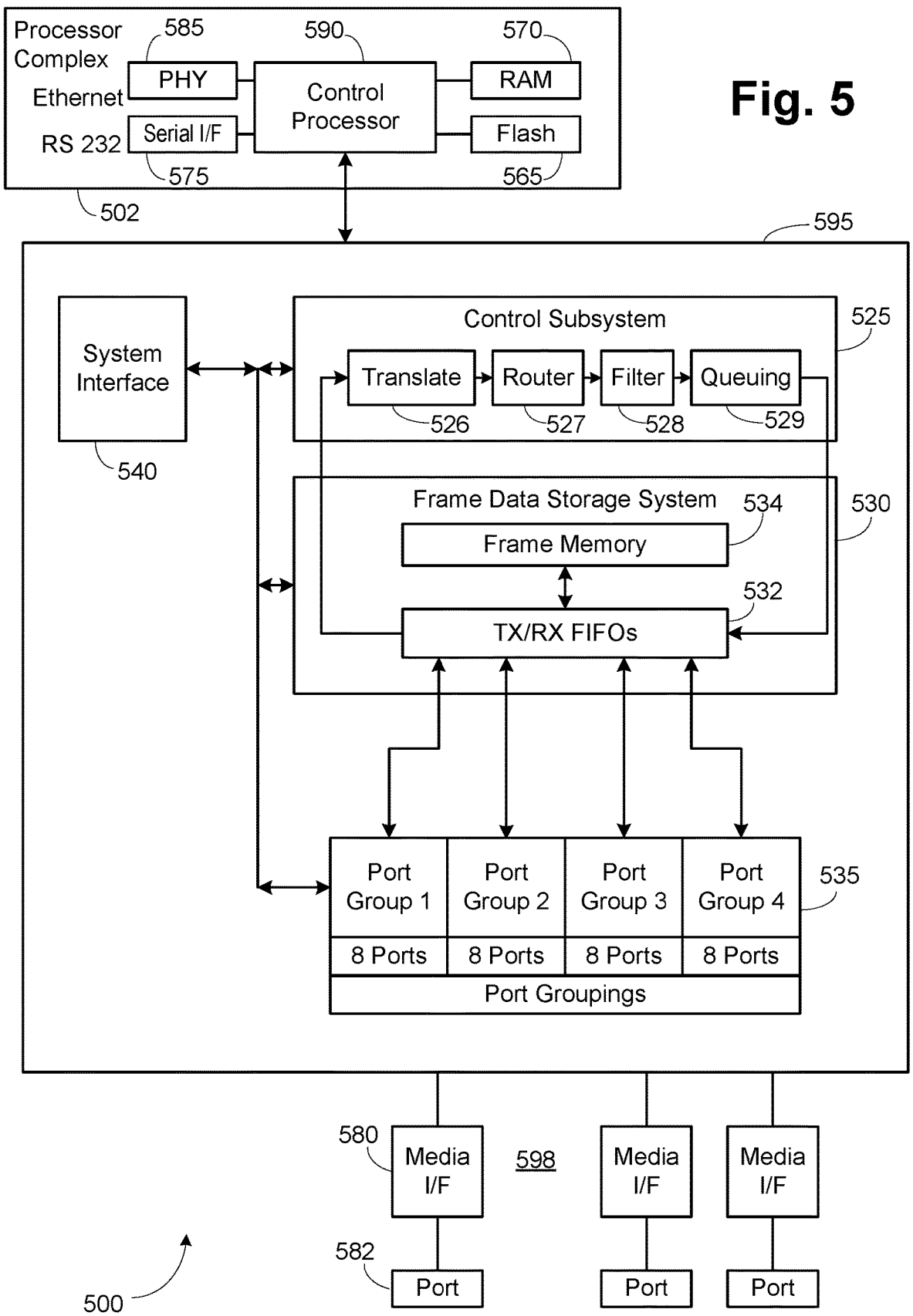
FIG. 5 is a block diagram of a Fibre Channel switch.

FIG. 5 is a block diagram of an exemplary switch 500. A control processor 590 on a processor complex 502 is connected to a switch ASIC 595, which operates as the internal switch fabric. The switch ASIC 595 is connected to media interfaces 580 which are connected to ports 582. Generally, the control processor 590 configures the switch ASIC 595 and handles higher level switch operations, such as the name server, and the like. The switch ASIC 595 handles general high speed inline or in-band operations, such as switching, routing and frame translation. The control processor 590 is connected to flash memory 565 to hold the programs that are used to control the operations of the switch 500 and to operate according to the relevant network protocols, to RAM 570 for working memory and to an Ethernet PHY 585 and serial interface 575 for out-of-band management.

The switch ASIC 595 has four basic modules, port groups 535, a frame data storage system 530, a control subsystem 525 and a system interface 540. The port groups 535 perform the lowest level of packet transmission and reception and are described in more detail below. Generally, frames are received by a port in a port group 535 from a media interface 580 and provided to the frame data storage system 530. Further, frames are received by a port in a port group 535 from the frame data storage system 530 and provided to the media interface 580 for transmission out of port 582. The frame data storage system 530 includes a set of transmit/receive FIFOs 532, which interface with the port groups 535, and a frame memory 534, which stores the received frames and frames to be transmitted. The frame data storage system 530 provides initial portions of each frame, typically the frame header and a payload header for FCP or Ethernet frames, to the control subsystem 525. The control subsystem 525 has translate 526, router 527, filter 528 and queuing 529 blocks. The translate block 526 examines the frame header and performs any necessary address translations. There can be various embodiments of the translation block 526, with examples of translation operation provided in U.S. Pat. Nos. 7,752,361 and 7,120,728, both of which are incorporated herein by reference in their entirety. Those examples also provide examples of the control/data path splitting of operations. The router block 527 examines the frame header and selects the desired output port for the frame. The filter block 528 examines the frame header, and the payload header in some cases, to determine if the frame should be transmitted. The queuing block 529 schedules the frames for transmission based on various factors including quality of service, priority and the like.

This is an exemplary switch configuration and many other configurations are used to develop switches.

Figure 6:
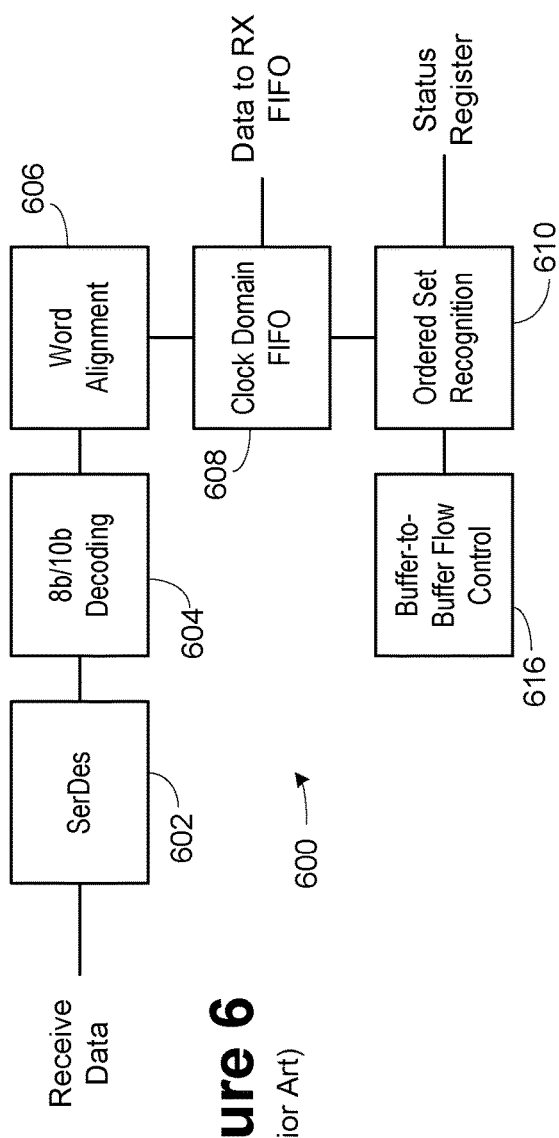
FIG. 6 is a block diagram of a receiver portion of an exemplary Fibre Channel port according to the prior art.

FIG. 6 illustrates an exemplary receive front end 600 of a Fibre Channel port, such as the port formed by the HBA 302 and a port in a port group 535 of the switch 500. In the case of the HBA 302, the receive front end is primarily in the FC MAC 328. Received data is provided to a SerDes 602, which converts the serial data to a 10 bit word. The to bit word is provided to an 8b/10b decoder 604, which develops the 8 bit value that was transmitted. If the port is capable of speeds which use 64b/66b encoding, the decoder 604 is both an 8b/10b and 64b/66b decoder, though an 8b/10b decoder is used for this description for simplification. The 8 bit value is provided to a word alignment block 606 to develop 32 bit words for use in the device. The 32 bit word is provided to a clock domain FIFO 608. One output of the FIFO 608 is provided to an ordered set recognition block 610. The ordered set recognition block 610 determines if any primitives have been received, with one method being the use of a state machine to track the characters being received to determine an ordered set. If an R_RDY or VC_RDY primitive has been received, the ordered set recognition block 610 provides an indication to a buffer-to-buffer flow control block 616, so that the BB_Credit_CNT register can be decremented, such as register 116 if the receive front end 600 is in the switch 106. In other cases, the ordered set recognition block 610 sets a flag in a status register that generates an interrupt for processor handling. The FIFO 608 also provides the 32 bit word to the RX FIFO, for example the RX FIFO 324 or TX/RX FIFOs 532, which form the input buffer 114. It is noted that if the ordered set recognition block 610 detects a primitive, that value is not provided to the RX FIFO, as it is not frame data. Thus, a primitive does not consume a credit.

Figure 7:
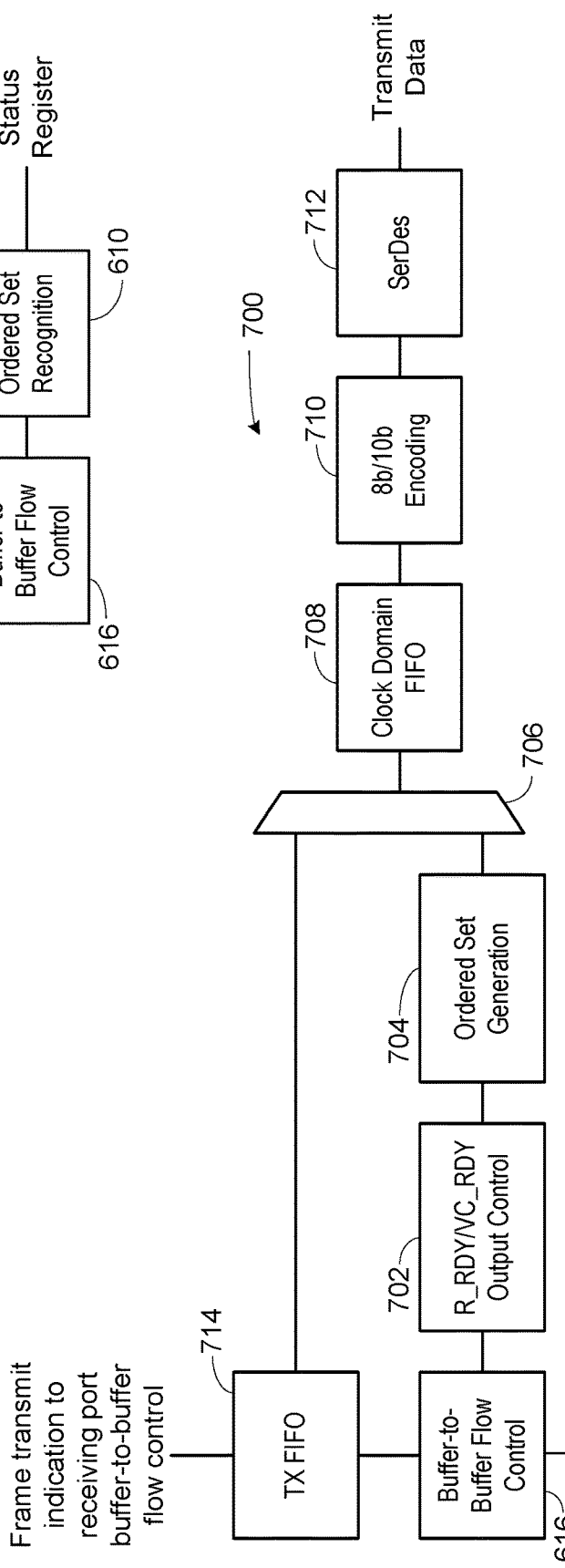
FIG. 7 is a block diagram of a transmit portion of an exemplary Fibre Channel port according to the prior art.

FIG. 7 illustrates a complementary transmit back end 700 of a Fibre Channel port. For purposes of this description, unless otherwise indicated, it is assumed that the transmit back end 700 is for the same port as the receive front end 600. The buffer-to-buffer flow control block 616 is connected to an R_RDY/VC_RDY or return credit output control block 702. The buffer-to-buffer flow control block 616 receives a frame transmit indication from a TX FIFO 714 that transmits a frame that was received by the receive front end 600 if the transmit back end 700 is in a port in a switch 500, thus indicating consumption of the frame by the switch 500. If the transmit front end 700 is in an HBA 302 in a storage unit 400, the buffer-to-buffer flow control block 616 receives a frame removal indication upon removal from the RX FIFO of the HBA 302, indicating that the storage unit 400 has consumed the frame, either by forwarding it to a disk drive or acting on the frame. These are indications that the buffer space used by that frame has been released and a credit can be provided. Both the transmission to the receiving port from the egress port and receipt by the receiving port are shown in FIG. 7, it being understood that the transmission from the TX FIFO 714 in FIG. 7 would be to a buffer-to-buffer flow control block 616 in a different port and that the receipt by the buffer-to-buffer flow control block 616 is from a TX FIFO 714 in a different port if the transmit back end 700 is in a switch port. When the TX FIFO 714 of the particular transmit back end 700 transmits a frame, an indication is provided to the buffer-to-buffer flow control block 616 of that particular transmit back end 700 so that the buffer-to-buffer flow control block 616 can increment the BB_Credit_CNT based on the transmitted frame.

When the buffer-to-buffer flow control block 616 receives the frame transmission from the egress port or HBA frame consumption indication, the buffer-to-buffer flow control block 616 provides a signal to the R_RDY/VC_RDY output control block 702 that an R_RDY/VC_RDY ordered set is to be provided to return the credit. The R_RDY/VC_RDY output control block 702 determines the particular VC_RDY if virtual channels are in use. The R_RDY/VC_RDY output control block 702 is connected to an ordered set generation block 704, which generates the actual ordered set that is the R_RDY or VC_RDY credit. In the case of R_RDY or VC_RDY, the ordered set is stored as such and simply provided when needed. A multiplexor 706 receives data from the TX FIFO 714 and the output of the ordered set generation block 704 and provides an output to a clock domain FIFO 708. The FIFO 708 is connected to an 8b/10b encoding block 710.

If the port is capable of speeds which use 64b/66b encoding, the encoding block 710 is both an 8b/10b and 64b/66b encoder, though an 8b/10b decoder is used for this description for simplification. The output of the 8b/10b encoding block 710 is provided to a serdes 712, whose output is the transmit serial data stream.

The receive front end 600 and the transmit back end 700 are illustrated for a simpler, lower speed configuration for simplicity. Higher speed variations add alternative elements for handling the differences between the various protocol speeds, but the basic elements described here are still present, though with alternatives in the various elements rather than the single variation described here for simplicity.

In devices according to the present invention, the ordered set recognition block 610 and the ordered set generation block 704 are modified. Referring to FIGS. 8 and 9, a receive front end 800, preferably present in the port of the slow draining device, such as the storage unit 400, and a transmit back end 900, preferably present in a port of the switch 500, are shown. An ordered set recognition block 810 includes an SLW block 818 which reviews received ordered sets for a new primitive called the SLW primitive. The SLW primitive indicates the presence of a slow drain condition and the need to provide transmission throttling. When a SLW primitive is detected by the SLW block 818, a new bit is set in the status register to indicate the receipt of SLW primitive. Preferably the setting of the SLW bit in the status register triggers an interrupt to the CPU 404, for example, as usually a storage unit is the slow drain device. Operation after the receipt of the interrupt is explained below.

A switch according to the present invention includes slow drain determination logic 914. The slow drain determination logic 914 determines the presence of a slow drain condition and the relevant port and virtual channel. An example of the slow drain determination logic 914 is shown in U.S. Pat. No. 8,599,691, entitled "Manageability Tools for Lossless Networks," which is hereby incorporated by reference. It is understood that there are other methods of determining a slow drain that could be used by the slow drain determination logic 914 and the manner described in the incorporated is just one embodiment. When slow drain determination logic 914 determines that a slow drain condition is occurring on the relevant port or virtual channel, a signal is provided to an ordered set generation block 904 to generate the SLW primitive. A SLW primitive generation block 916 generates the SLW primitive and the SLW primitive is provided through the multiplexer 706 and becomes part of the transmitted data.

While the receive front end 800 is preferably in the HBA 302 in the storage unit 400 or the host 300, the receive front end 800 can also be present in the ports in a switch 500. Similarly, while the transmit back end goo is preferably in the ports of the switch 500, the transmit back end 900 can also be in the port of the HBA 302.

Figure 10:
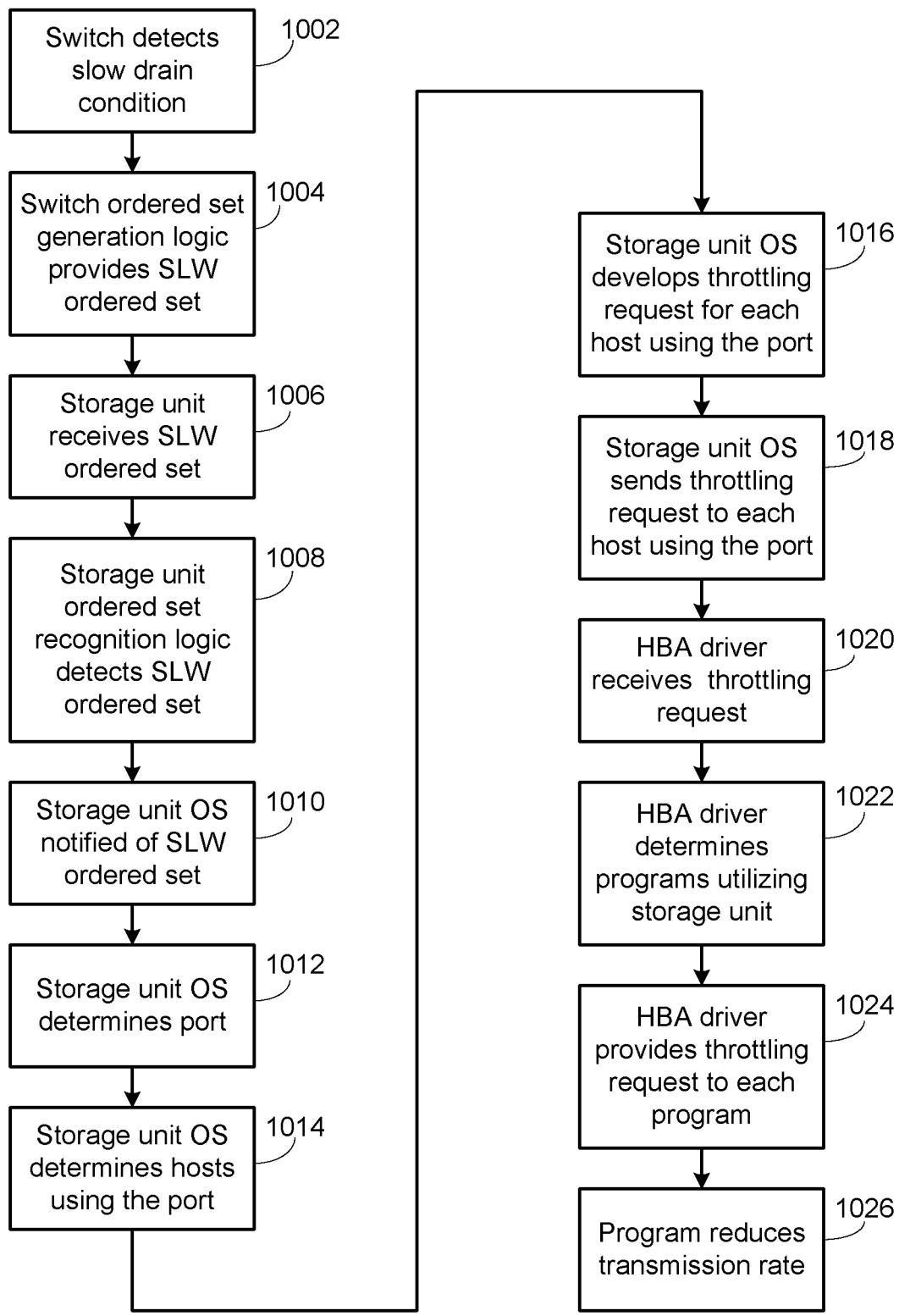
FIG. 10 is a flowchart of operation according to the present invention.

FIG. 10 illustrates the operations upon detection of a slow drain condition. In step 1002 the switch 500 detects the slow drain condition. In step 1004 the ordered set generation block 904 provides the SLW primitive. In step 1006 the storage unit 400, for example, receives the SLW primitive. In step 1008 the ordered set recognition block 812 in the storage unit 400 detects the SLW primitive. In step 1010 the CPU 404 is notified of the SLW primitive through the status register and an interrupt. In step 1012 the storage unit operating system 410 determines the port providing the SLW primitive indication. In step 1014 the storage unit operating system 410 determines the host computers 300 using that port. The host determination can be done in many ways, such as by monitoring frame addresses or by determining hosts that have performed a process login (PRLI) with the storage unit. Many other ways to determine the host are possible. In step 1016 the storage unit operating system 410 develops a throttling request for each host. In step 1018 the storage unit operating system 410 sends the throttling requests to the host computers 300. In step 1020 the HBA driver 312 receives the throttling request. In step 1022 the HBA driver 312 determines the various programs, such as program A 314, that are using the storage unit 400. There are many possible ways for the host driver to determine the programs, such as by PRLI tracking, frame address monitoring, querying a hypervisor and the like. In step 1024 the HBA driver 312 provides the throttling request to the program. The throttling request may be as received or may be altered as appropriate for the relevant program. In step 1026 the program reduces the transmission rate, which should alleviate or at least reduce the slow drain condition.

While the slow drain determination is described as being done in the switch connected to the slow draining device, the slow drain determination can be done in any device that is experiencing a slow drain condition. If done in a upstream switch connected to a downstream switch, the upstream switch issues the SLW primitive and the downstream switch forwards the SLW primitive to end devices that are contributing to the slow drain condition.

While the exemplary slow drain device is a storage unit receiving write data from a host, the slow draining device can be a host receiving read data from a storage unit. In that case the host detects the SLW primitive and issues throttling instructions to the various storage units providing read data to the host, so that the storage unit can slow down read data transmission.

While Fibre Channel has been used as the exemplary credit-based protocol, other credit-based protocols could be used as well.

In the prior art implementations, a message could not be sent to the target because there was no available credit. As primitives do not consume credits, as mentioned above, the use of the SLW primitive works even when the buffer is full and there is no available credit. Therefore, by defining a new primitive to indicate a slow drain condition, an indication message can be passed to the target even when there is no available credit, allowing the target to determine the problem state and initiate corrective action.

The above description is intended to be illustrative, and not restrictive. For example, the above-described embodiments may be used in combination with each other. Many other embodiments will be apparent to those of skill in the art upon reviewing the above description.

The invention claimed is:

1. A system comprising:
a switch including:
   a switch port for transmitting frames and primitives to a connected device, the switch port transmitting frames based on available credit, the switch port including switch ordered set generation logic for generating primitives for transmission by the switch port, including a slow drain primitive; and
   logic coupled to the switch port and to the switch ordered set generation logic to determine a slow drain condition at the switch port and to provide a slow drain indication to the switch ordered set generation logic upon determination of the slow drain condition at the switch port,
   wherein the switch ordered set generation logic is configured to provide the slow drain primitive for transmission by the switch port upon receipt of the slow drain indication; and
a device coupled to the switch, the device including:
   a device port for receiving frames and primitives from a connected switch, the device port receiving frames based on available credit, the device port including device ordered set recognition logic for detecting primitives received by the device port, including a slow drain primitive, and an output for providing an indication of the receipt of the slow drain primitive; and
   a processor and associated memory containing an operating system coupled to the output of the device port to receive the indication of the receipt of the slow drain primitive and programmed to provide a throttling output request to a source providing frames to the device upon receiving the indication of the receipt of the slow drain primitive,
wherein the switch port is coupled to the device port.

2. The system of claim 1, the switch further including:
a switch transmit FIFO coupled to the switch port for providing frames to be transmitted by the switch port, wherein the switch port further includes:
   a multiplexer coupled to the switch transmit FIFO and the switch ordered set generation logic for receiving frames from the switch transmit FIFO and primitives from the switch ordered set generation logic;
   switch ordered set recognition logic for detecting primitives received by the switch port, including R_RDY or VC_RDY primitives, and an output indication reception of an R_RDY or VC_RDY primitive; and
   a switch buffer-to-buffer flow control block coupled to the switch ordered set recognition logic and to the switch transmit FIFO for determining available credit, the switch buffer-to-buffer flow control block having an input for receiving an R_RDY or VC_RDY primitive received indication from the switch ordered set recognition logic, an input for consumption of a received frame signal and an output, the switch buffer-to-buffer flow control block providing a signal on the output that a credit is to be returned upon receipt of a consumption of a received frame signal, wherein the switch buffer-to-buffer flow control block output is coupled to the switch ordered set generation logic,
wherein the switch ordered set generation logic is further for generating R_RDY or VC_RDY primitives, and
wherein the switch ordered set generation logic is configured to generate an R_RDY or VC_RDY primitive upon receipt of a signal indicating that a credit is to be returned.

3. The system of claim 2, wherein the device port further includes:
a device transmit FIFO coupled to the device port for providing frames to be transmitted by the device port, wherein the device port further includes:
   device ordered set generation logic for generating primitives for transmission by the device port, including R_RDY or VC_RDY primitives; and
   a device buffer-to-buffer flow control block coupled to the device transmit FIFO for determining available credit, the device buffer-to-buffer flow control block having an input coupled to the device ordered set recognition logic, an input for consumption of a received frame signal and an output, the device buffer-to-buffer flow control block providing a signal on the output that a credit is to be returned upon receipt of a consumption of a received frame signal,
wherein the device ordered set recognition logic is further for detecting received R_RDY or VC_RDY primitives and providing an output to the device buffer-to-buffer flow control block indicating detection of a received R_RDY or VC_RDY primitive,
wherein the device buffer-to-buffer flow control block output is coupled to the device ordered set generation logic, and
wherein the device ordered set generation logic is configured to generate an R_RDY or VC_RDY primitive upon receipt of a signal indicating that a credit is to be returned.

4. The system of claim 1, wherein the device port further includes:
a device transmit FIFO coupled to the device port for providing frames to be transmitted by the device port, wherein the device port further includes:
   device ordered set generation logic for generating primitives for transmission by the device port, including R_RDY or VC_RDY primitives; and
   a device buffer-to-buffer flow control block coupled to the device transmit FIFO for determining available credit, the device buffer-to-buffer flow control block having an input coupled to the device ordered set recognition logic, an input for consumption of a received frame signal and an output, the device buffer-to-buffer flow control block providing a signal on the output that a credit is to be returned upon receipt of a consumption of a received frame signal,
wherein the device ordered set recognition logic is further for detecting received R_RDY or VC_RDY primitives and providing an output to the device buffer-to-buffer flow control block indicating detection of a received R_RDY or VC_RDY primitive,
wherein the device buffer-to-buffer flow control block output is coupled to the device ordered set generation logic, and
wherein the device ordered set generation logic is configured to generate an R_RDY or VC_RDY primitive upon receipt of a signal indicating that a credit is to be returned.

5. A switch comprising:
a port for transmitting frames and primitives to a connected device, the port transmitting frames based on available credit, the port including ordered set generation logic for generating primitives for transmission by the port, including a slow drain primitive;
logic coupled to the port and to the ordered set generation logic to determine a slow drain condition at the port and to provide a slow drain indication to the ordered set generation logic upon determination of the slow drain condition at the port, wherein the ordered set generation logic is configured to provide the slow drain primitive for transmission by the port upon receipt of the slow drain indication; and
a device coupled to the switch, the device including:
a processor and associated memory containing an operating system coupled to an output of a port of the device to receive an indication of receipt of a slow drain primitive and programmed to provide a throttling output request to a source providing frames to the device upon receiving the indication of the receipt of the slow drain primitive.

6. The switch of claim 5, further comprising:
a transmit FIFO coupled to the port for providing frames to be transmitted by the port,
wherein the port further includes:
a multiplexer coupled to the transmit FIFO and the ordered set generation logic for receiving frames from the transmit FIFO and primitives from the ordered set generation logic;
ordered set detection logic for detecting primitives received by the port, including R_RDY or VC_RDY primitives and an output indication reception of an R_RDY or VC_RDY primitive; and
a buffer-to-buffer flow control block coupled to the ordered set detection logic and to the transmit FIFO for determining available credit, the buffer-to-buffer flow control block having an input for receiving an R_RDY or VC_RDY primitive received indication from the ordered set detection logic, an input for consumption of a received frame signal and an output, the buffer-to-buffer flow control block providing a signal on the output that a credit is to be returned upon receipt of a consumption of a received frame signal,
wherein the buffer-to-buffer flow control block output is coupled to the ordered set generation logic,
wherein the ordered set generation logic is further for generating R_RDY or VC_RDY primitives, and
wherein the ordered set generation logic is configured to generate an R_RDY or VC_RDY primitive upon receipt of a signal indicating that a credit is to be returned.

7. A device comprising:
a port for receiving frames and primitives from a connected switch, the port receiving frames based on available credit, the port including ordered set recognition logic for detecting primitives received by the port, including a slow drain primitive, and an output for providing an indication of the receipt of the slow drain primitive; and
a processor and associated memory containing an operating system coupled to the output of the port to receive the indication of the receipt of the slow drain primitive and programmed to provide a throttling output request to a source providing frames to the device upon receiving the indication of the receipt of the slow drain primitive,
wherein the device is coupled to a switch, the switch including:
a switch port for transmitting frames and primitives to a connected device, the switch port transmitting frames based on available credit, the switch port including ordered set generation logic for generating primitives for transmission by the switch port, including a slow drain primitive, and
wherein the ordered set generation logic of the switch is configured to provide the slow drain primitive for transmission by the switch port upon receipt of a slow drain indication.

8. The device of claim 7, wherein the device further comprises:
a transmit FIFO coupled to the port for providing frames to be transmitted by the port,
wherein the port further includes:
ordered set generation logic for generating primitives for transmission by the port, including R_RDY or VC_RDY primitives; and
a buffer-to-buffer flow control block coupled to the transmit FIFO for determining available credit, the buffer-to-buffer flow control block having an input coupled to the ordered set recognition logic, an input for consumption of a received frame signal and an output, the buffer-to-buffer flow control block providing a signal on the output that a credit is to be returned upon receipt of a consumption of a received frame signal,
wherein the ordered set recognition logic is further for detecting received R_RDY or VC_RDY primitives and providing an output to the buffer-to-buffer flow control block indicating detection of a received R_RDY or VC_RDY primitive,
wherein the buffer-to-buffer flow control block output is coupled to the ordered set generation logic, and
wherein the ordered set generation logic is configured to generate an R_RDY or VC_RDY primitive upon receipt of a signal indicating that a credit is to be returned.

9. A method comprising the steps of:
determining a slow drain condition at a switch port of a switch;
providing a slow drain primitive for transmission by the switch port upon determining a slow drain condition at the switch port;
detecting the slow drain primitive received by a device port of a device; and
providing a throttling output request to a source providing frames to the device port upon detecting the slow drain primitive,
wherein the device further comprises:
a transmit FIFO coupled to the device port for providing frames to be transmitted by the device port,
wherein the device port further includes:
ordered set generation logic for generating primitives for transmission by the device port, including R_RDY or VC_RDY primitives; and
a buffer-to-buffer flow control block coupled to the transmit FIFO for determining available credit, the buffer-to-buffer flow control block having an input coupled to the ordered set recognition logic, an input for consumption of a received frame signal and an output, the buffer-to-buffer flow control block providing a signal on the output that a credit is to be returned upon receipt of a consumption of a received frame signal.

10. The method of claim 9, further comprising the steps of:
consuming received frames by the device;
incrementing a credit counter in the switch port when transmitting a frame from the switch port;
generating and transmitting R_RDY or VC_RDY primitives from the device port when a received frame is consumed; and
decrementing the credit counter when an R_RDY or VC_RDY primitive is received by the switch port.

11. The switch of claim 5, further comprising:
the device including:
the device port for receiving frames and primitives from a connected switch, the device port receiving frames based on available credit, the device port including device ordered set recognition logic for detecting primitives received by the device port, including the slow drain primitive, and an output for providing an indication of the receipt of the slow drain primitive,
wherein the switch port is coupled to the device port.

12. The switch of claim 5, further comprising:
a transmit FIFO coupled to the port for providing frames to be transmitted by the port,
wherein the port further includes:
a multiplexer coupled to the transmit FIFO and the ordered set generation logic for receiving frames from the transmit FIFO and primitives from the ordered set generation logic;
ordered set detection logic for detecting primitives received by the port, including R_RDY or VC_RDY primitives and an output indication reception of an R_RDY or VC_RDY primitive; and
a buffer-to-buffer flow control block coupled to the ordered set detection logic and to the transmit FIFO for determining available credit, the buffer-to-buffer flow control block having an input for receiving an R_RDY or VC_RDY primitive received indication from the ordered set detection logic, an input for consumption of a received frame signal and an output, the buffer-to-buffer flow control block providing a signal on the output that a credit is to be returned upon receipt of a consumption of a received frame signal.

13. The device of claim 7, wherein the device further comprises:
a transmit FIFO coupled to the port for providing frames to be transmitted by the port,
wherein the port further includes:
ordered set generation logic for generating primitives for transmission by the port, including R_RDY or VC_RDY primitives; and
a buffer-to-buffer flow control block coupled to the transmit FIFO for determining available credit, the buffer-to-buffer flow control block having an input coupled to the ordered set recognition logic, an input for consumption of a received frame signal and an output, the buffer-to-buffer flow control block providing a signal on the output that a credit is to be returned upon receipt of a consumption of a received frame signal.

14. The method of claim 9, further comprising:
receiving, at the device port, frames based on available credit; and
providing an indication of receipt of the slow drain primitive.

15. The method of claim 9, wherein the switch port is coupled to the device port.

16. The method of claim 9, further comprising:
transmitting frames and primitives to a connected device, wherein frames are transmitted based on available credit;
generating primitives for transmission, including the slow drain primitive; and
providing the slow drain primitive for transmission upon receipt of a slow drain indication.

* * * * *